US012379221B2

(12) United States Patent
Vashisht

(10) Patent No.: US 12,379,221 B2
(45) Date of Patent: Aug. 5, 2025

(54) DETECTION OF A GEOGRAPHIC LOCATION MENTIONED IN A COMMUNICATION SESSION WITH A REMOTE PARTICIPANT FOR VEHICLE ROUTE GENERATION

(71) Applicant: Cisco Technology, Inc., San Jose, CA (US)

(72) Inventor: Vikas Vashisht, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 250 days.

(21) Appl. No.: 18/165,673

(22) Filed: Feb. 7, 2023

(65) Prior Publication Data

US 2024/0263956 A1 Aug. 8, 2024

(51) Int. Cl.
*G01C 21/36* (2006.01)
(52) U.S. Cl.
CPC ....... *G01C 21/3608* (2013.01); *G01C 21/362* (2013.01)
(58) Field of Classification Search
CPC .................. G01C 21/3608; G01C 21/362
See application file for complete search history.

(56) References Cited

U.S. PATENT DOCUMENTS

| 11,036,920 B1 | 6/2021 | Barndollar et al. |
| 2012/0089331 A1 | 4/2012 | Schmidt et al. |
| 2018/0299288 A1 | 10/2018 | Herbst et al. |
| 2019/0383632 A1* | 12/2019 | Bostick ............... G06F 40/30 |
| 2021/0243555 A1 | 8/2021 | Reed et al. |

FOREIGN PATENT DOCUMENTS

KR           101126422 B1 *  3/2012  ........... G01C 21/362

OTHER PUBLICATIONS

English Machine Translation of KR101126422B1 (Year: 2012).*
Zhen, et al., "Navigation-Oriented Natural Spoken Language Understanding for Intelligent Vehicle Dialogue," 2017 IEEE Intelligent Vehicles Symposium (IV), Jun. 2017, 6 pages.
Kulkarni, "Driving ahead with Webex," https://blog.webex.com/hybrid-work/collaboration-in-vehicle-experiences/, Mar. 31, 2022, 5 pages.

* cited by examiner

*Primary Examiner* — Andrew J Cromer
(74) *Attorney, Agent, or Firm* — Edell, Shapiro & Finnan, LLC

(57) ABSTRACT

One or more processors of a vehicle determine a destination location mentioned during a communication session that is at least partially conducted from the vehicle with one or more remote users. The one or more processors store the destination location in a tab of destinations. The tab corresponds to a context of the destination location. The one or more processors generate for display on a user interface a route for the vehicle to the destination location of the tab in response to an indication triggering a navigation action for the destination location.

20 Claims, 9 Drawing Sheets

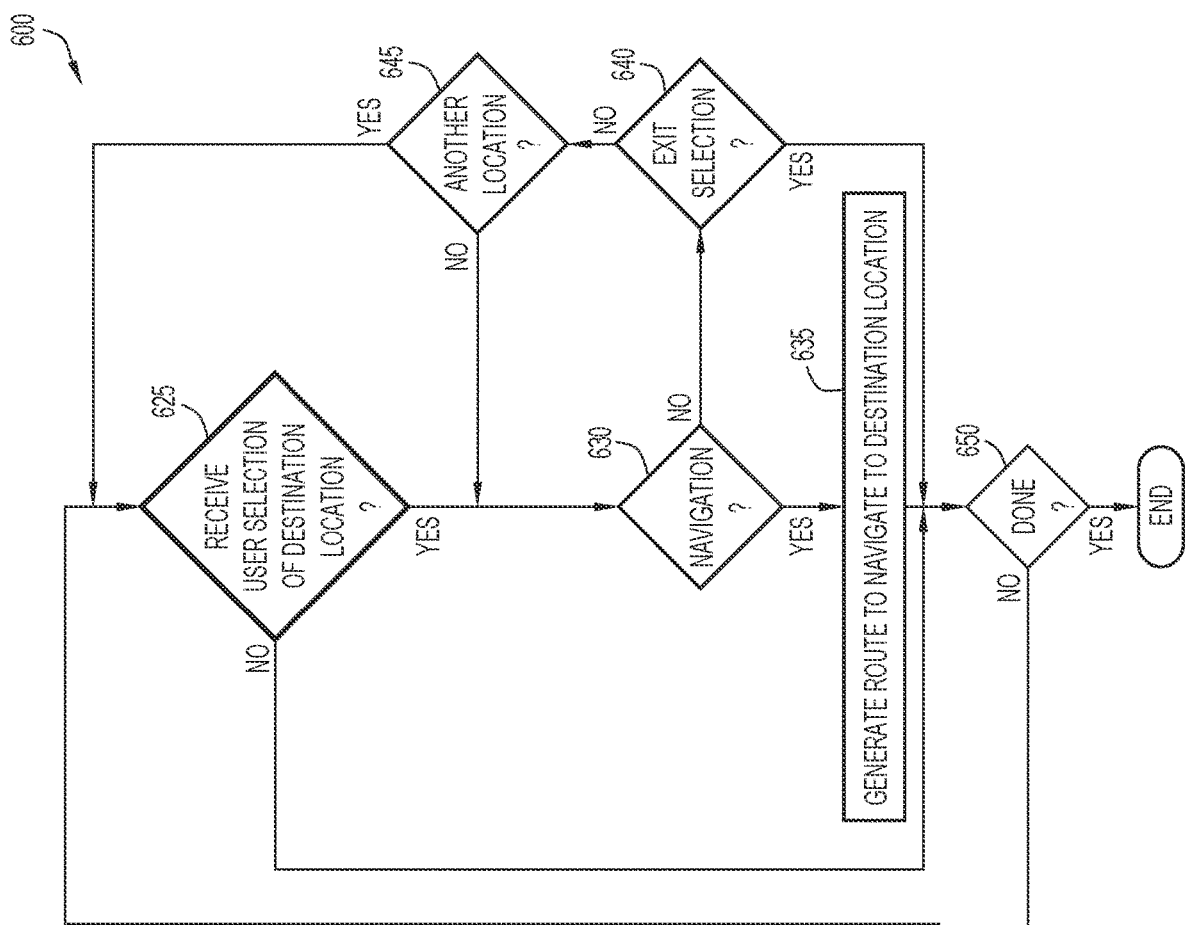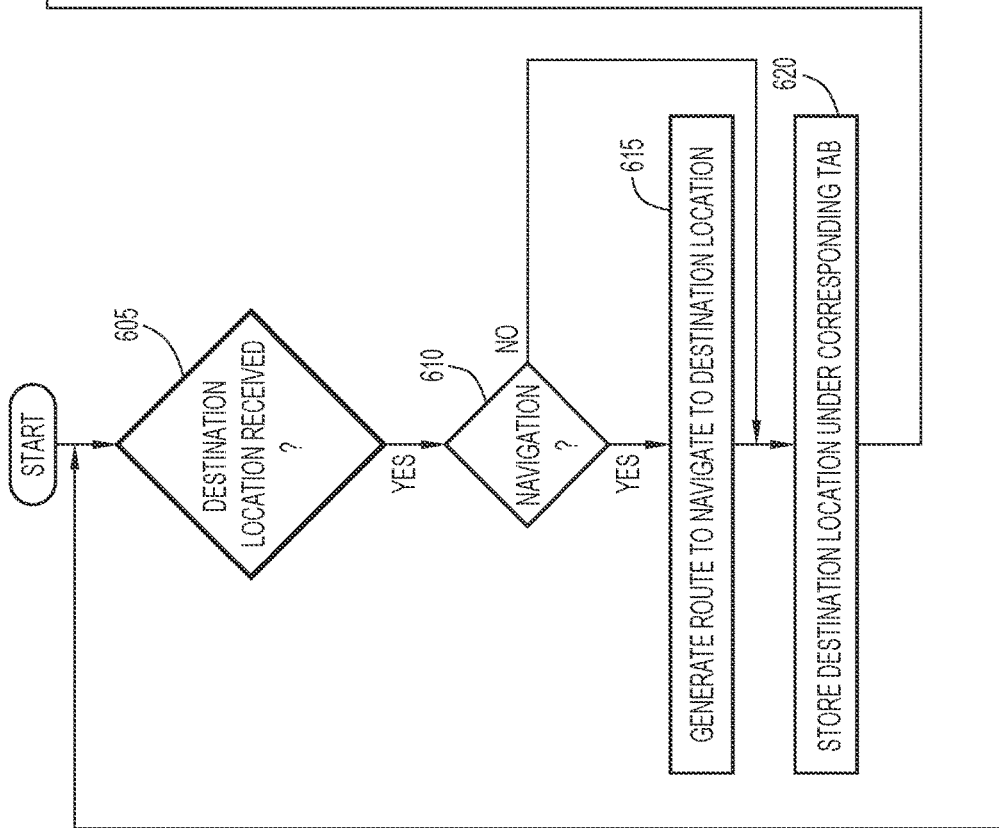
FIG.6

DETECTION OF A GEOGRAPHIC LOCATION MENTIONED IN A COMMUNICATION SESSION WITH A REMOTE PARTICIPANT FOR VEHICLE ROUTE GENERATION

TECHNICAL FIELD

The present disclosure relates to vehicle navigation systems and communication systems.

BACKGROUND

A hybrid work environment enables workers to change the location and manner of performing their work. The availability of 5G networking provides for an increasing number of service technicians and other mobile workers that may use collaboration tools from their cars. However, while driving a car, service technicians and other mobile workers occasionally may be directed to customer sites or other destinations mentioned during a communication session (e.g., a call or chat) and desire a navigation system to provide routes to those destinations.

BRIEF DESCRIPTION OF THE DRAWINGS

FIG. 6 is a flowchart of a method for processing detected destination locations to generate routes to the detected destination locations, according to an example embodiment.

DESCRIPTION OF EXAMPLE EMBODIMENTS

Overview

Figure 1:
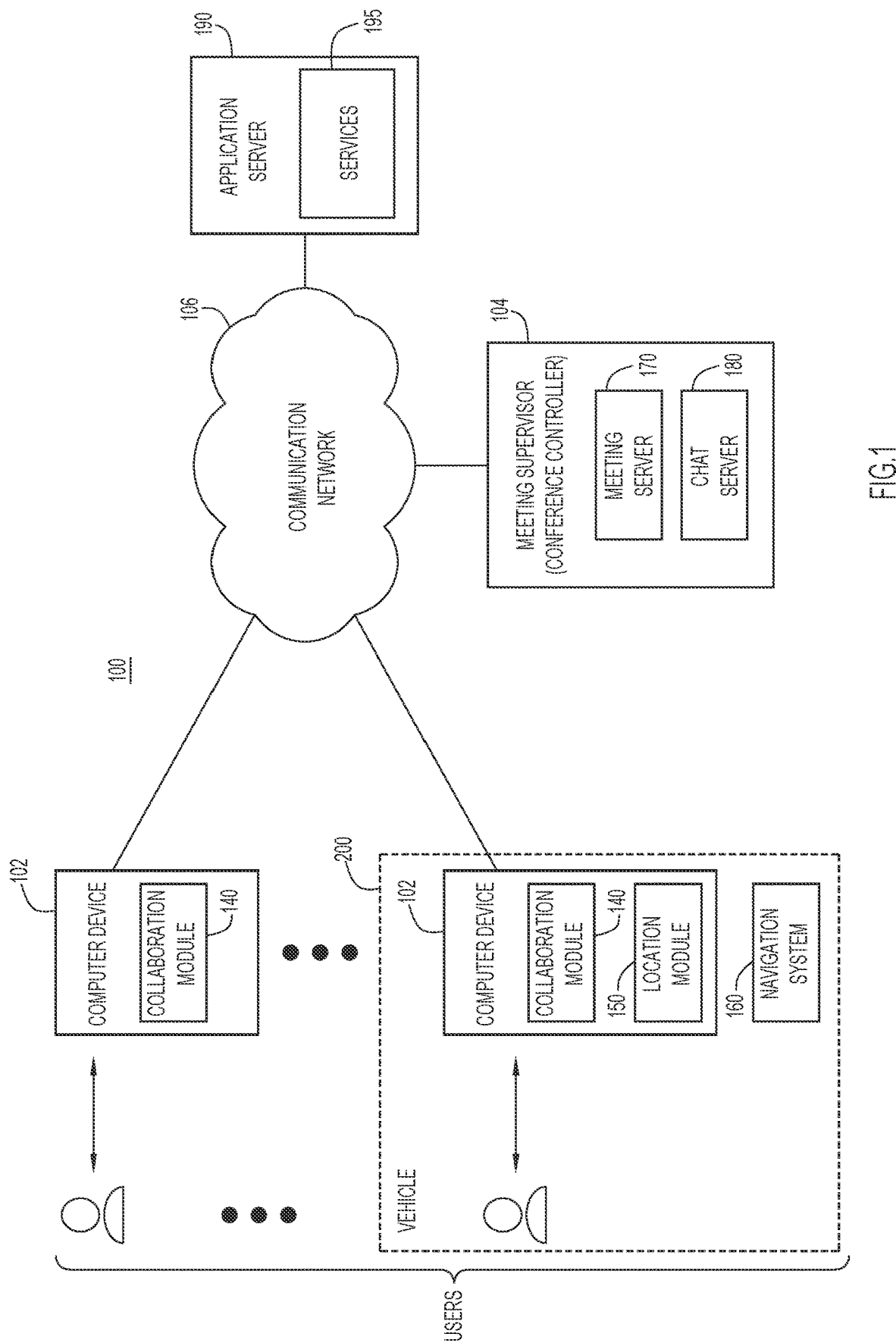
FIG. 1 is a block diagram of an example online collaboration environment in which detection and management of destination locations mentioned during a collaboration session may be implemented, according to an example embodiment.

In one example embodiment, one or more processors of a vehicle determine a destination location mentioned during a communication session that is at least partially conducted from the vehicle with one or more remote users. The one or more processors store the destination location in a tab of destinations. The tab corresponds to a context of the destination location. The one or more processors generate for display on a user interface a route for the vehicle to the destination location of the tab in response to an indication triggering a navigation action for the destination location.

Example Embodiments

An example embodiment captures a destination location (e.g., geographic or street address, geographic coordinates, establishment name or point of interest, etc.) from a communication session (e.g., a call, chat, online collaboration session or meeting, etc.) conducted from a car or other vehicle, and automatically provides the captured destination location to a vehicle navigation system. In an embodiment, an application or module is embedded in the car or other vehicle to implement an interface with the vehicle navigation system that allows the vehicle navigation system to initiate navigation to a provided destination location (e.g., geographic or street address, geographic coordinates, name or point of interest, etc.) with a confirmation or start command. The provided destination location is preferably detected from a communication session occurring in the car or other vehicle with a remote participant over a network (e.g., a call, chat, online collaboration session or meeting, etc.).

In an embodiment, the embedded application or module may implement an interface to provide the destination locations (e.g., geographic or street address, geographic coordinates, establishment name or point of interest, etc.) in a specific address tab (e.g., recent/relevant tab, client/customer tab, meeting tab, call tab, etc.) of the vehicle navigation system from an additional source, such as a communication session occurring in the car or other vehicle. The embedded application or module is capable of adding destination locations to the corresponding tab for easy selection when a user initiates a navigation action.

In an embodiment, an application programming interface (API) from a cloud environment may instruct the embedded application or module to interface the vehicle navigation system by providing a destination location (e.g., geographic or street address, geographic coordinates, establishment name or point of interest, etc.) from cloud services.

By way of example, a service technician participating in a meeting from a vehicle is told to drive to an address that is spoken during the meeting. In an embodiment, an agent (implemented locally on a vehicle or in a cloud environment) may monitor a conversation in a meeting and identify a relevant destination address to which a participant attending the meeting from a car is being instructed to drive. The present embodiment may use an interface with the navigation system to convey the identified destination for route generation for the participant in the car.

By way of another example, the service technician may be instructed to travel to an address that is posted in a collaboration space associated with the meeting. In an embodiment, an address listed in a collaboration space to which a meeting is associated may be selected from a recent/relevant navigation address section or tab of a navigation system. The address may be highlighted or otherwise visually modified (e.g., color change, bold, different font or size, underlined, etc.) and/or provided with an indicator (e.g., text, symbol, image, icon, etc.) to indicate a source/context of the address.

The present embodiments provide an easy, seamless, and effective manner to convey destination locations captured from a communication session conducted from a vehicle to a vehicle navigation system while enhancing safety of a user of the vehicle since the user does not have to fumble around to look for or remember the destination location during operation of the vehicle.

In addition, present embodiments may implement techniques described herein natively to apply to audio or other calls active on an audio system of the car or other vehicle. In this case, automatic speech recognition (ASR)/natural language processing (NLP) techniques may be implemented locally on the vehicle to capture destination locations occurring within the calls.

While the present embodiments are described with respect to detecting and managing destination locations mentioned or otherwise provided (e.g., in one or more of audio, chat messages, and postings) during a communication session for conveyance to a navigation system for route generation, it will be appreciated that the destination locations may be detected and managed for users performing or engaging in other activities with respect to any type of motor or other vehicle (e.g., automobile, car, truck, van, boat, ship, bus, plane, motor cart, motorcycle, etc.) for any navigation or other system in substantially the same manner described below. A destination location may be any geographic location, where the geographic location may be indicated by, or include, any location information (e.g., name of an establishment, entity, or point of interest; street or other address; geographic coordinates; etc.).

FIG. 1 illustrates a block diagram of an example online collaboration or meeting environment 100 in which an embodiment presented herein may be implemented. Environment 100 includes multiple computer devices 102 (collectively referred to as computer devices, user or participant devices, or platforms) operated by local users/participants, a meeting supervisor or server (also referred to as a "conference controller") 104 configured to support online (e.g., web-based or over-a-network) collaborative meetings between the computer devices, and a communication network 106 communicatively coupled to the computer devices and the meeting supervisor. Meeting supervisor 104 may include a meeting server 170 to handle multimedia data for the meeting exchanged between computer devices 102 of meeting participants (e.g., video data, audio data, etc.), and a chat server 180 to handle chat or text messages for the meeting exchanged between computer devices 102 of meeting participants. Computer devices 102 can take on a variety of forms, including a smartphone, tablet, laptop computer, desktop computer, video conference endpoint, computing device of a car or other vehicle, and the like.

Communication network 106 may include one or more wide area networks (WANs), such as the Internet, and one or more local area networks (LANs). Computer devices 102 may communicate with each other, and with meeting supervisor 104, over communication network 106 using a variety of known or hereafter developed communication protocols. For example, the computer devices 102 and meeting supervisor 104 may exchange Internet Protocol (IP) data packets, Realtime Transport Protocol (RTP) media packets (e.g., audio and video packets), and so on.

Computer devices 102 may each host a collaboration module 140 that may establish/join online meetings. In some embodiments, one or more computer devices 102 may be integrated with a car or other vehicle 200, and further include a location module 150 for detecting destination locations mentioned or otherwise provided during an online meeting. Vehicle 200 further includes a navigation system 160 to generate routes for the vehicle to a desired destination location. The navigation system may be implemented by any conventional or other navigation systems producing vehicle routes to intended destinations (e.g., based on GPS sensors and position coordinates, conventional or other route generation (or shortest path) algorithms, etc.).

According to embodiments presented herein, when a computer device 102 of a vehicle joins an online meeting via collaboration module 140, location module 150 of the computer device can detect and manage destination locations mentioned or otherwise provided (e.g., in one or more of audio, chat messages, and postings) during the meeting as described below. In an embodiment, an application server 190 coupled to communication network 106 may provide cloud or other services 195 performing the functionality of location module 150 to detect and manage destination locations mentioned or otherwise provided (e.g., in any of one or more of audio, chat messages, and postings) during the meeting in substantially the same manner described below. In this case, data from the meeting (e.g., audio, chat messages, etc.) may be provided from collaboration module 140 to cloud or other services 195 for processing, and the detected destination locations are provided (e.g., via an API or other interface) to collaboration module 140 for conveyance to navigation system 160. The API or other interface may direct collaboration module 140 to interact with navigation system 160 to navigate to, and/or store, the destination locations.

Figure 2:
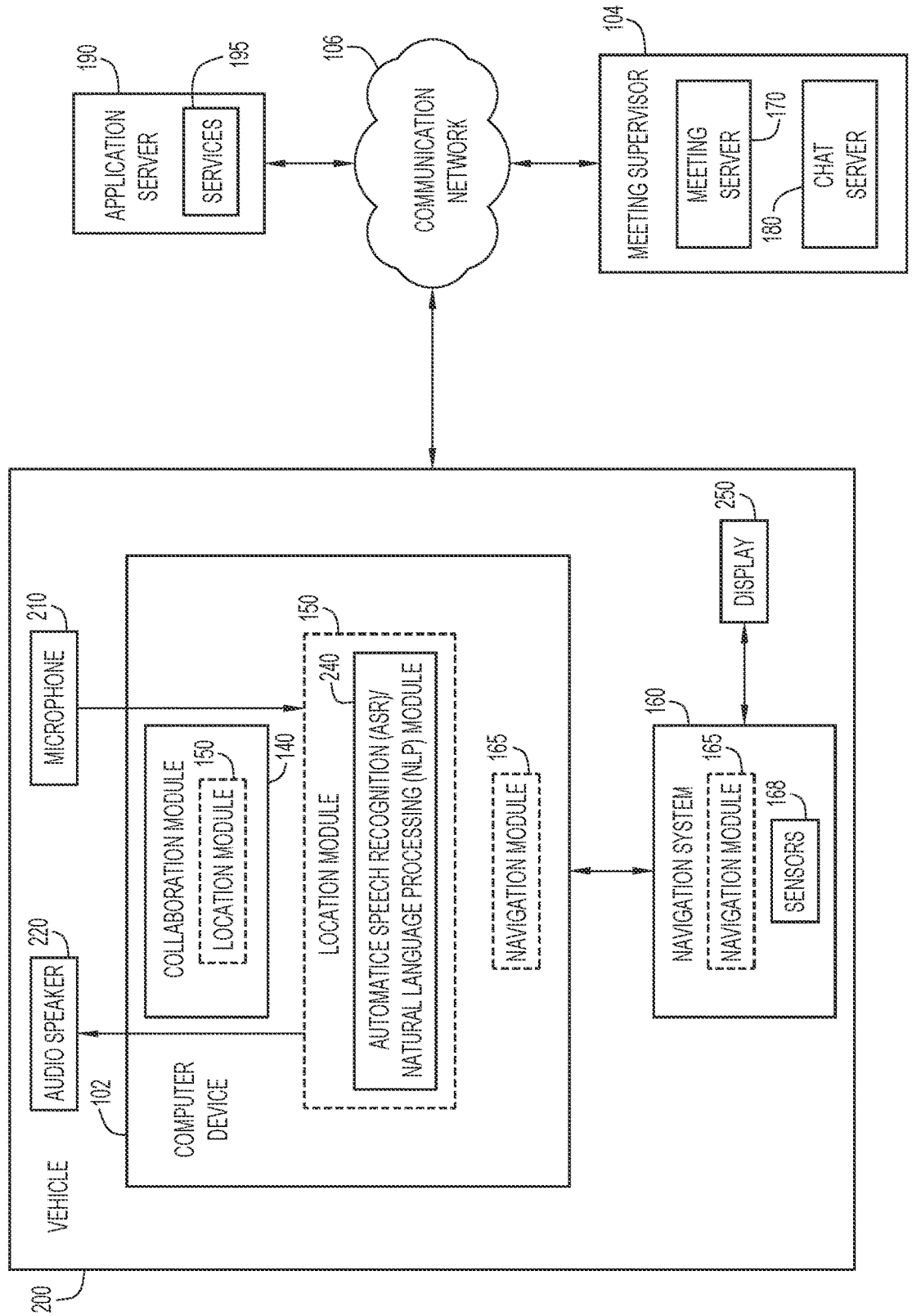
FIG. 2 illustrates a block diagram of a system configured for detecting and managing destination locations mentioned during a collaboration session, according to an example embodiment.

With continuing reference to FIG. 1, FIG. 2 illustrates a computer device of vehicle 200 configured for detecting and managing destination locations mentioned during a collaboration session, according to an example embodiment.

Initially, car or other vehicle 200 includes computer device 102 that enables a user of vehicle 200 to join an online meeting conducted by meeting supervisor 104 over communication network 106. Meeting server 170 of meeting supervisor 104 may exchange audio and video information captured for the meeting between computer devices 102 of meeting participants, while chat server 180 may exchange chat or text messages for the meeting between computer devices 102 of meeting participants. In an embodiment, computer device 102 of vehicle 200 includes collaboration module 140 and location module 150. Location module 150 may be a separate module, or be included within collaboration module 140. Collaboration module 140 enables a user of the vehicle to participate in an online meeting from vehicle 200, while location module 150 performs detection and management of destination locations mentioned or otherwise provided during the meeting (e.g., in audio, in chat messages, etc.).

Vehicle 200 includes navigation system 160 that produces and displays routes to locations. Navigation system 160 includes a navigation module 165 and GPS and/or other sensors 168. Sensors 168 may be implemented by any conventional or other sensors. Navigation module 165 produces routes for locations based on information from sensors 168 (e.g., GPS coordinates, vehicle speed, traffic conditions, etc.). Navigation module 165 may perform operations utilizing one or more processors of navigation system 160, or may reside on and utilize one or more processors of computer device 102 of vehicle 200 to perform operations. Navigation system 160 may be implemented by any conventional or other navigation systems producing vehicle routes to intended destinations, where navigation module 165 may utilize any conventional or other route generation (or shortest path) algorithms to produce the routes.

Vehicle 200 may further include an audio system (e.g., including a microphone or other sound sensing device 210 to capture the user voice and produce audio information and an audio speaker 220 to provide sound) and a display 250 to present vehicle routes from navigation system 160 to the user on a user interface. A meeting participant may mention or otherwise provide a destination location during the meeting for which the user of the vehicle may desire to visit. Location module 150 may detect and convey the provided destination location to navigation module 165 of navigation system 160 for generation and display of vehicle routes to the provided destination location.

Location module 150 includes an automatic speech recognition (ASR)/natural language processing (NLP) module 240. Collaboration module 140 interacts with meeting supervisor 104 to exchange meeting information (e.g., audio, chat messages, etc.) and enable the vehicle user to participate in the online meeting. The chat messages may be from an active chat session created as part of the meeting, a session from where the meeting was launched, or any association established between the meeting and the chat session.

In addition, automatic speech recognition (ASR)/natural language processing (NLP) module 240 receives the audio and chat information for the meeting from collaboration module 140 and detects destination locations mentioned or otherwise provided during the meeting (e.g. in audio, in chat messages, etc.) as described below. ASR/NLP module 240 may employ any conventional or other speech to text mechanisms (e.g., speech-to-text applications, etc.) to generate a transcript or textual representation of the meeting audio. The transcript and chat messages may be analyzed to detect a destination location. ASR/NLP module 240 may further employ any conventional or other natural language processing (NLP) mechanisms (e.g., entity extraction, relationship extraction, sentiment/emotion analysis, keyword extraction, part-of-speech (POS) tagger, etc.) to analyze the transcript and chat messages to detect destination locations. For example, the destination location may be identified based on natural language processing (NLP) of the transcript or chat message.

In addition, natural language processing (NLP) (e.g., entity extraction, relationship extraction, sentiment/emotion analysis, keyword extraction, part-of-speech (POS) tagger, etc.) may be used to identify sentiment, context, intent, specific words or commands, or other aspects of the audio transcript or chat message. The context (e.g., a home or home address, client/customer or client/customer address, warehouse or warehouse address, office or office address, point of interest, etc.) may be used to tag the detected destination locations for storage in corresponding tabs of navigation system 160. The intent may be used to initiate navigation to a detected destination location. By way of example, specific words or phrases may indicate an intent to travel to the detected destination location (e.g., "I am leaving now . . . ", etc.). Further, the conversation may include sentiment or emotion indicating an intent to travel to the destination location (e.g., the NLP may determine a score for emotion, sentiment and other attributes and indicate an intent to travel to the destination location based on the score exceeding a score threshold, etc.).

In an embodiment, automatic speech recognition (ASR)/natural language processing (NLP) module 240 may employ one or more machine learning models to generate a transcript and/or analyze the transcript and/or chat message. The machine learning models may be implemented by any conventional or other machine learning models (e.g., mathematical/statistical, classifiers, feed-forward, recurrent, convolutional or other neural networks, etc.). By way of example, generation of the transcript and analysis of the transcript and chat message may be performed by corresponding neural networks.

For example, neural networks may include an input layer, one or more intermediate layers (e.g., including any hidden layers), and an output layer. Each layer includes one or more neurons, where the input layer neurons receive input (e.g., audio information, text, feature vectors of audio information, feature vectors of text, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network for transcript generation may be performed using a training set of audio signals for different words as input and corresponding classifications (e.g., words, etc.) as outputs, where the neural network attempts to produce the provided output (or classification) and uses an error from the output (e.g., difference between produced and known outputs) to adjust weight (and bias) values (e.g., via backpropagation or other training techniques).

In an embodiment, the machine learning for transcript generation may be performed using a training set of audio signals for different words as input and known words as outputs, where the neural network attempts to produce the provided output (or word). In an embodiment, the audio signals and corresponding known words may be used for the training set as input. In an embodiment, feature vectors may be extracted from the audio signals and used with the corresponding known words for the training set as input. A feature vector may include any suitable features of the audio (e.g., frequency, pitch, amplitude, etc.).

The output layer of the neural network for transcript generation indicates a classification (e.g., word, etc.) for input data. By way of example, the classes used for the classification may include a class associated with each word. The output layer neurons may provide a classification (or specify a particular class) that indicates a corresponding word. Further, output layer neurons may be associated with the different classes, and indicate a probability for the input data being within a corresponding class (e.g., a probability of the input data being in a class associated with a corresponding word, etc.). The class associated with the highest probability is preferably selected as the class (or word) for the input data.

Similarly, in an embodiment, machine learning for detection of destination locations may be performed using a neural network as described above with a training set of different types of words or phrases for destination locations as input and known classifications (e.g., indicating presence of a destination location, indicating absence of a destination location, etc.) as outputs, where the neural network attempts to produce the provided output (or indication of the presence or absence of a destination location). In an embodiment, the words or phrases and corresponding known classifications may be used for the training set as input. In an embodiment, feature vectors may be extracted from the words or phrases (e.g., word frequency, length, etc.) and used with the corresponding known classifications for the training set as input.

In an embodiment, machine learning for detection of intent to travel to destination locations may be performed using a neural network as described above with a training set of different types of words or phrases for intent as input and known classifications (e.g., indicating presence of an intent, indicating an absence of an intent, etc.) as outputs, where the neural network attempts to produce the provided output (or indication of the presence or absence of an intent). In an embodiment, the words or phrases and corresponding known classifications may be used for the training set as input. In an embodiment, feature vectors may be extracted from the words or phrases (e.g., word frequency, length, etc.) and used with the corresponding known classifications for the training set as input.

The input layer of the neural network for transcript generation may receive the audio information from the meeting or feature vectors, where the output layer of the neural network indicates the corresponding words for the transcript. Further, the input layer of the neural network for detection of destination locations may receive the transcript, chat message, or feature vectors, while the output layer of the neural network for detection of destination locations indicates a classification (e.g., presence of a destination location, absence of a destination location, etc.) for words or phrases of the transcript or chat message. In addition, the input layer of the neural network for detection of intent may receive the transcript, chat message, or feature vectors, while the output layer of the neural network for detection of intent indicates a classification (e.g., presence of intent to travel to a destination location, absence of intent to travel to a destination location, etc.) for words or phrases of the transcript or chat message.

In an embodiment, cloud or other services 195 of application server 190 may perform the functionality of location module 150 and detect and manage destination locations mentioned or otherwise provided during the meeting in substantially the same manner described above. In this case, data from the meeting (e.g., audio, chat messages, etc.) may be provided to cloud or other services 195 from collaboration module 140 and/or meeting supervisor 104 for processing, and the detected destination locations are provided (e.g., via an API or other interface) to collaboration module 140 for conveyance to navigation module 165 of navigation system 160. The API or other interface may direct collaboration module 140 to interact with navigation system 160 to navigate to, and/or store, the destination locations.

Figure 3:
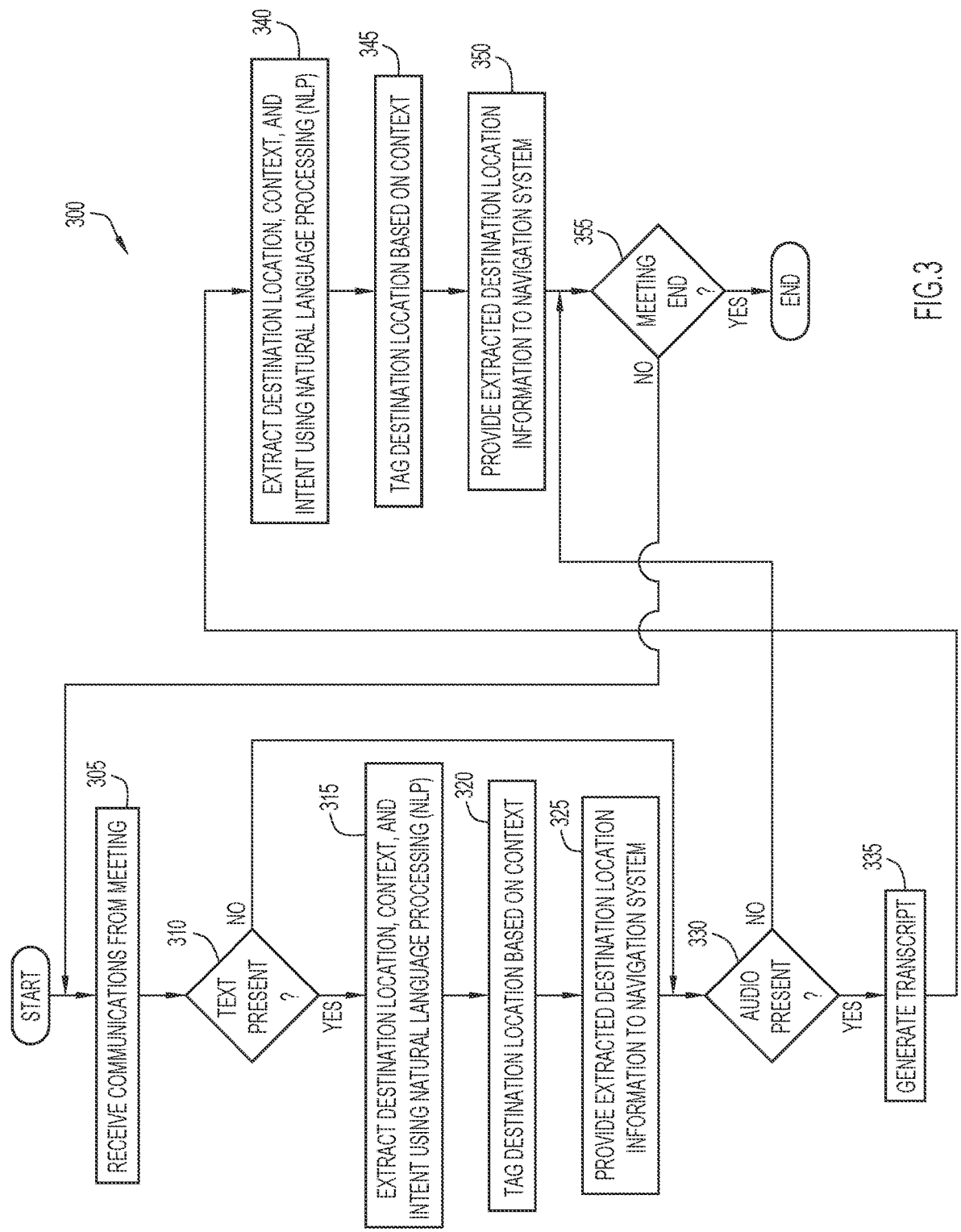
FIG. 3 is a flowchart of a method for detecting destination locations mentioned during a collaboration session, according to an example embodiment.

With continued reference to FIGS. 1 and 2, FIG. 3 illustrates a flowchart of an example method 300 for detecting destination locations mentioned during a collaboration session according to an example embodiment.

Initially, communications from a meeting or other collaboration session are received by collaboration module 140 at operation 305. The communications may include audio information of meeting participants, chat messages, and/or posts to a space. The audio information may be segmented for analysis into segments of any desired time intervals (e.g., corresponding to time intervals of audio of the machine learning training set, etc.). Similarly, the text (or chat messages) may be segmented for analysis into segments of any quantity of words or phrases (e.g., corresponding to the quantity of words or phrases of the machine learning training set, etc.). When a communication includes text (or a chat message or post) as determined at operation 310, collaboration module 140 provides the communication to automatic speech recognition (ASR)/natural language processing (NLP) module 240. ASR/NLP module 240 extracts one or more destination locations, context, and an intent to travel to those destination locations from the communication at operation 315. Destination location information in a chat message or post may include pin drops, longitude/latitude or other coordinates, and/or a description of a geographical or street address. For example, the text of the communication may be processed by the machine learning models for detection of destination locations and intent to determine the presence of destination locations and an intent to travel to those locations in the text (or chat message or post). The machine learning models analyze the communication (or feature vectors), and provide an output (e.g., classification, probability, etc.) indicating the presence (or absence) of a destination location and intent in substantially the same manner described above.

Automatic speech recognition (ASR)/natural language processing (NLP) module 240 may further determine a context for the determined destination location (e.g., a home or home address, client/customer or client/customer address, warehouse or warehouse address, office or office address, point of interest, etc.) based on natural language processing (NLP) of the text in the communication in substantially the same manner described above. Location module 150 may tag the detected destination locations with their corresponding context at operation 320, and provides determined destination location information (e.g., destination locations, context, intent, etc.) to navigation module 165 of navigation system 160 (e.g., via an API or other interface) at operation 325. The tag enables the destination location to be stored in a corresponding tab of navigation system 160 as described below. The destination location may be stored in response to receipt of the destination location, or in response to a navigation action to the destination location. The destination locations may be viewed on an easy access tab of navigation system 160 and sorted based on detected user intents to arrange the destination locations in a list with the most relevant destination location positioned higher in the list.

When a communication includes audio as determined at operation 330, collaboration module 140 provides the communication to automatic speech recognition (ASR)/natural language processing (NLP) module 240. ASR/NLP module 240 generates a transcript from the audio at operation 335. For example, the audio may be processed by the machine learning model for transcript generation to produce a transcript of the audio. The machine learning model analyzes the transcript (or feature vectors), and provides an output (e.g., classification, probability, etc.) indicating the words for the audio to produce the transcript in substantially the same manner described.

Automatic speech recognition (ASR)/natural language processing (NLP) module 240 processes the generated transcript to extract one or more destination locations, context, and an intent to travel to those destination locations from the communication at operation 340. For example, the transcript of the audio may be processed by the machine learning models for detection of destination locations and intent to travel to those destination locations to determine the presence of destination locations and intent to travel to those destination locations in the transcript. The machine learning models analyze the transcript (or feature vectors), and provides an output (e.g., classification, probability, etc.) indicating the presence (or absence) of a destination location and intent to travel to the destination location in substantially the same manner described above.

Automatic speech recognition (ASR)/natural language processing (NLP) module 240 may further determine a context for the determined destination location (e.g., a home or home address, client/customer or client/customer address, warehouse or warehouse address, office or office address, point of interest, etc.) based on natural language processing (NLP) of the transcript in substantially the same manner described above. Location module 150 may tag the detected destination locations with their corresponding context at operation 345, and provides the determined destination location information (e.g., destination locations, context, intent, etc.) to navigation module 165 of navigation system 160 (e.g., via an API or other interface) at operation 350. The tag enables the destination location to be stored in a corresponding tab of the navigation system as described below. The destination location may be stored in response to receipt of the destination location, or in response to a navigation action to the destination location. The destination locations may be viewed on an easy access tab of the navigation system and sorted based on detected user intents to arrange the destination locations in a list with the most relevant destination location positioned higher in the list.

The above process repeats from operation 305 until the meeting ends as determined at operation 355.

A present embodiment may monitor an active conversation and trigger navigation module 165 of navigation system 160 to come to the foreground with relevant destination locations or the most pertinent destination location highlighted (or otherwise indicated) based on tags associated with the destination locations when an intent from the local user is to drive to a previously identified destination location. For example, the destination location may be highlighted or otherwise visually modified (e.g., color change, bold, different font or size, underlined, etc.) and/or provided with an indicator (e.g., text, symbol, image, icon, etc.) to indicate the destination location. Location module 150 or cloud or other services 195 may monitor the conversation for the destination locations.

For example, when an audio speaker and microphone of a car or other vehicle is active, a user of the vehicle is engaged in a conversation with a remote participant. Audio from the microphone (corresponding to the user of the vehicle) and audio speaker (corresponding to the remote participant) may be analyzed by automatic speech recognition (ASR)/natural language processing (NLP) of a present embodiment. When the remote participant mentions a destination location, the destination location is extracted and placed in the relevant address tab of navigation system 160. In addition, the intent of the user is determined and navigation system 160 may be prompted to generate a route to the destination location when the user intends to travel to the destination location.

Figure 4:
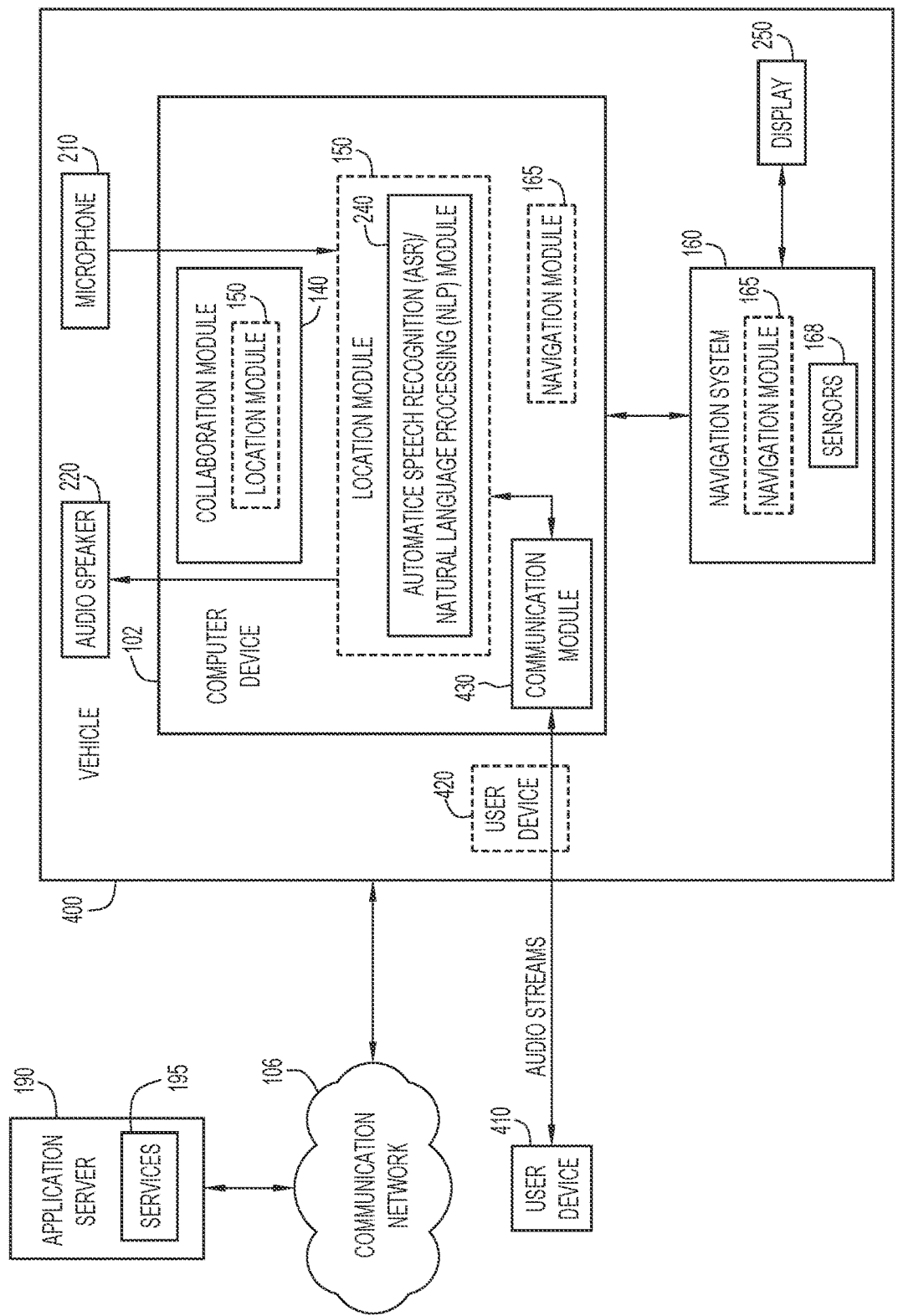
FIG. 4 illustrates a block diagram of a system configured for detecting and managing destination locations mentioned during a telephone call, according to an example embodiment.
Figure 5:
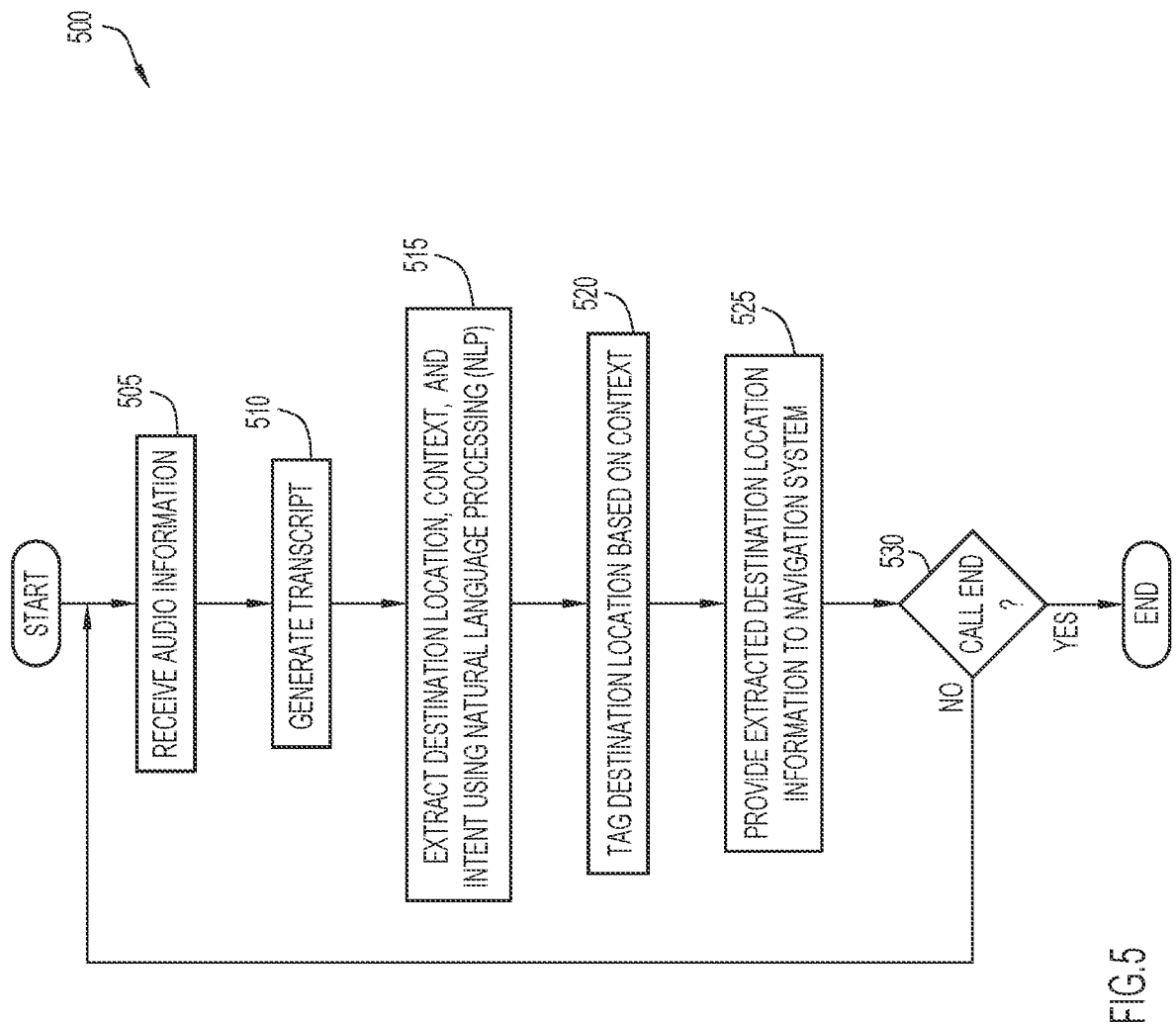
FIG. 5 is a flowchart of a method for detecting destination locations mentioned during a telephone call, according to an example embodiment.

FIG. 4 illustrates a block diagram of a system configured for detecting and managing destination locations mentioned during a telephone call, according to an example embodiment.

Initially, a car or other vehicle 400 includes a computer device 102 that enables a user of the vehicle to conduct a telephone call with a user device 410 (e.g., smartphone or other device with call capability) of a remote participant. Vehicle 400 is substantially similar to vehicle 200 described above. In an embodiment, computer device 102 of vehicle 400 includes collaboration module 140, location module 150, and communication module 430. Location module 150 performs detection and management of destination locations mentioned or otherwise provided during the telephone call (e.g., in audio, etc.). Location module 150 may be a separate module, or be included within collaboration module 140 as described above. Collaboration module 140 enables a user of the vehicle to participate in an online meeting from vehicle 400 as described above. However, for telephone calls, collaboration module 140 may simply detect destination locations mentioned or otherwise provided during the call when location module 150 is included within collaboration module 140. Communication module 430 enables the user of the vehicle to conduct telephone calls, either directly (e.g., over a wireless network) or through a user device 420 (e.g., smartphone or other wireless device with call capability). In the case of conducting the call through user device 420, communication module 430 interfaces user device 420 to place and receive telephone calls and conduct the calls over a vehicle audio system.

Vehicle 400 includes navigation system 160 that produces and displays routes to locations. Navigation system 160 includes navigation module 165 and GPS and/or other sensors 168. Navigation module 165 produces routes for locations based on information from sensors 168 (e.g., GPS coordinates, vehicle speed, traffic conditions, etc.) as described above. Navigation module 165 may perform operations utilizing one or more processors of navigation system 160, or may reside on and utilize one or more processors of computer device 102 of vehicle 400 to perform operations.

Vehicle 400 may further include an audio system (e.g., including microphone or other sound sensing device 210 to capture the user voice and produce audio information for the telephone call and audio speaker 220 to provide sound from the telephone call), and display 250 to present vehicle routes from navigation system 160 to the user on a user interface. A telephone call participant may mention or otherwise provide a destination location during the telephone call for which the user of the vehicle may desire to visit. Location module 150 may detect and convey the provided destination location to navigation module 165 of navigation system 160 for generation and display of vehicle routes to the provided destination location.

Location module 150 includes automatic speech recognition (ASR)/natural language processing (ASR/NLP) module 240. ASR/NLP module 240 receives audio from the telephone call and detects destination locations mentioned during the call as described below. The audio for the call is obtained from the audio stream of the user from microphone 210, and from the audio stream received from the remote participant and played or rendered through audio speaker 220. ASR/NLP module 240 may employ any conventional or other speech to text mechanisms (e.g., speech-to-text applications, etc.) to generate a transcript or textual representation of the call audio in substantially the same manner described above. The transcript may be analyzed to detect a destination location. For example, the destination location may be identified based on natural language processing (NLP) of the transcript.

In addition, machine learning and/or natural language processing (NLP) (e.g., entity extraction, relationship extraction, sentiment/emotion analysis, keyword extraction, part-of-speech (POS) tagger, etc.) may be used to identify sentiment, context, intent, specific words or commands, or other aspects of the audio in substantially the same manner described above. The context (e.g., a home or home address, client/customer or client/customer address, warehouse or warehouse address, office or office address, point of interest, etc.) may be used to tag the detected destination locations for storage in corresponding tabs of navigation system 160. The intent may be used to initiate navigation to a detected destination location. By way of example, specific words or phrases may indicate an intent to travel to the detected destination location (e.g., "I am leaving now . . . ", etc.). Further, the telephone call may include sentiment or emotion indicating an intent to travel to the destination location (e.g., the NLP may determine a score for emotion, sentiment and other attributes and indicate an intent to travel to the destination location based on the score exceeding a score threshold, etc.).

In an embodiment, cloud or other services 195 may perform the functionality of location module 150 and detect and manage destination locations mentioned during the telephone call in substantially the same manner described below. In this case, data from the telephone call (e.g., audio, etc.) may be provided from location module 150 (within or external of collaboration module 140) to cloud or other services 195 for processing, and the detected destination locations are provided (e.g., via an API or other interface) to location module 150 (within or external of collaboration module 140) for conveyance to navigation module 165 of navigation system 160 (e.g., via an API or other interface). The API or other interface may direct location module 150 (or collaboration module 140) to interact with navigation system 160 to navigate to, and/or store, the destination location.

With continued reference to FIGS. 1-4, FIG. 5 illustrates a flowchart of an example method 500 for detecting destination locations mentioned during a telephone call according to an example embodiment.

Initially, audio information of a telephone call conducted from a vehicle (e.g., including audio of a vehicle user and remote participant) is received by location module 150 at operation 505. The audio information may be segmented for analysis into segments of any desired time intervals (e.g., corresponding to time intervals of the corresponding machine learning training set, etc.). Location module 150 provides the audio information to automatic speech recognition (ASR)/natural language processing (NLP) module 240 that generates a transcript of the conversation at operation 510 in substantially the same manner described above.

Automatic speech recognition (ASR)/natural language processing (NLP) module 240 processes the generated transcript to extract one or more destination locations, context, and an intent to travel to those destination locations from the communication at operation 515 in substantially the same manner described above.

Location module 150 may tag the detected destination locations with their corresponding context at operation 520, and provides determined destination location information (e.g., destination locations, context, intent, etc.) to navigation module 165 of navigation system 160 (e.g., via an API or other interface) at operation 525. The tag enables the destination location to be stored in a corresponding tab of navigation system 160 as described below. The destination location may be stored in response to receipt of the destination location, or in response to a navigation action to the destination location. The destination locations may be viewed on an easy access tab of navigation system 160 and sorted based on detected user intents to arrange the destination locations in a list with the most relevant destination location positioned higher in the list.

The above process repeats from operation 505 until the call ends as determined at operation 530.

With continued reference to FIGS. 1-5, FIG. 6 illustrates a flowchart of an example method 600 for processing detected destination locations to generate routes to the detected destination locations according to an example embodiment.

Initially, a participant joins or establishes a communication session (e.g., telephone call, chat, online meeting, etc.) from a vehicle through a computer device 102. The communication session is monitored to detect destination locations mentioned or otherwise provided during the communication session as described above.

When a destination location is detected during the communication session and corresponding destination location information (e.g., destination location, tag/context, intent, etc.) is received by navigation system 160 as determined at operation 605, navigation system 160 (via navigation module 165) analyzes the destination location information for indications of a navigation action. When the analysis indicates that a navigation action is to be performed as determined at operation 610, navigation module 165 generates and displays on a user interface of display 250 a route for the participant to navigate the vehicle to the destination location at operation 615. The destination location information may indicate an intent of the user to travel to the destination location that triggers initiation of the navigation action (e.g., generation and/or display of the route, etc.). Thus, in an embodiment, an intent of the user to travel to the destination location automatically initiates generation and/or display of a route to the destination location.

Further, navigation module 165 may analyze other information for triggering performance of a navigation action. By way of example, the participant may indicate a desire to perform a navigation action for a detected destination location. For example, the detected destination location may be displayed by navigation system 160 and the participant may actuate an input mechanism (e.g., a displayed button or other actuator, etc.) of navigation system 160 to trigger the navigation action. The detected destination location may be displayed within a corresponding recent location or other tab of navigation system 160 and highlighted (or otherwise visually modified) and/or arranged toward a top of a destination list to indicate a recently detected destination location. For example, the detected destination location may be highlighted or otherwise visually modified (e.g., color change, bold, different font or size, underlined, etc.) and/or provided with an indicator (e.g., text, symbol, image, icon, etc.) to indicate a recently detected destination location. Moreover, user preferences may be used with parameters that enable or disable automatic navigation of a detected destination location.

When an indication to perform the navigation is absent as determined at operation 610, or after the navigation action is performed at operation 615, navigation module 165 stores the destination location under a corresponding location section or tab (FIG. 7) maintained by navigation system 160 at operation 620. The corresponding tab is determined based on the tag/context for the destination location (e.g., a home or home address, client/customer or client/customer address, warehouse or warehouse address, office or office address, point of interest, etc.). For example, the tabs may correspond to the context/tags and include recent or previous locations (e.g., previously navigated, previously detected, etc.), locations for a certain client/customer, particular communication session (e.g., call or meeting), etc. The context is compared to the tabs (e.g., based on matching, partial matching, feature vector distances, etc.) to determine a tab corresponding to the context. The locations within a tab may be sorted, ranked, or otherwise arranged based on relevance (e.g., recent mentions during an active communication session, etc.).

The participant of the vehicle may further access navigation system 160 to select a desired location from the tabs for which to generate and display a route. For example, the participant may initially select a tab to display a list of corresponding locations, and select a location from the list. The displayed locations may include destination locations detected during communication sessions.

When a user selection is received by navigation system 160 as determined at operation 625, navigation system 160 (via navigation module 165) analyzes information for indications of a navigation action. When the analysis indicates that a navigation action is to be performed as determined at operation 630, navigation module 165 generates and displays on a user interface of display 250 a route for the participant to navigate the vehicle to the selected location at operation 635. For example, the selected destination location may be displayed by navigation system 160 and the participant may actuate an input mechanism (e.g., a displayed button or other actuator, etc.) of navigation system 160 to trigger the navigation action. A detected destination location may be displayed within a corresponding recent location or other tab of navigation system 160 and highlighted (or otherwise visually modified or provided with an indicator) to indicate a detected destination location. For example, a detected destination location may be highlighted or otherwise visually modified (e.g., color change, bold, different font or size, underlined, etc.) and/or provided with an indicator (e.g., text, symbol, image, icon, etc.) to indicate a detected destination location.

When an indication to perform the navigation is absent as determined at operation 630, the user may desire to terminate the selection as determined at operation 640. In this case, the navigation system returns to operation 605 to repeat method 600 when the navigation system remains enabled as determined at operation 650. When the participant desires to maintain the selection as determined at operation 645, the navigation system returns to operation 630 to analyze (via navigation module 165) information for an indication to perform the navigation action as described above. When the participant desires a new selection as determined at operation 645, the navigation system returns to operation 625 to receive a new selected location as described above.

The above process is repeated from operation 605 until navigation system 160 is disabled (e.g., turned off, hibernating or sleeping, etc.) as determined at operation 650.

With continued reference to FIGS. 1-6, FIG. 7 illustrates an example user interface 700 for managing and selecting destination locations for route generation, according to an example embodiment.

User interface 700 is presented by navigation module 165 of navigation system 160 on display 250 of a car or other vehicle 200, 400. User interface 700 presents locations for user selection to generate a route to the selected locations. The user may select a location by manipulating an input mechanism (e.g., display buttons or actuators, mechanical actuators, etc.) of navigation system 160.

Figure 7:
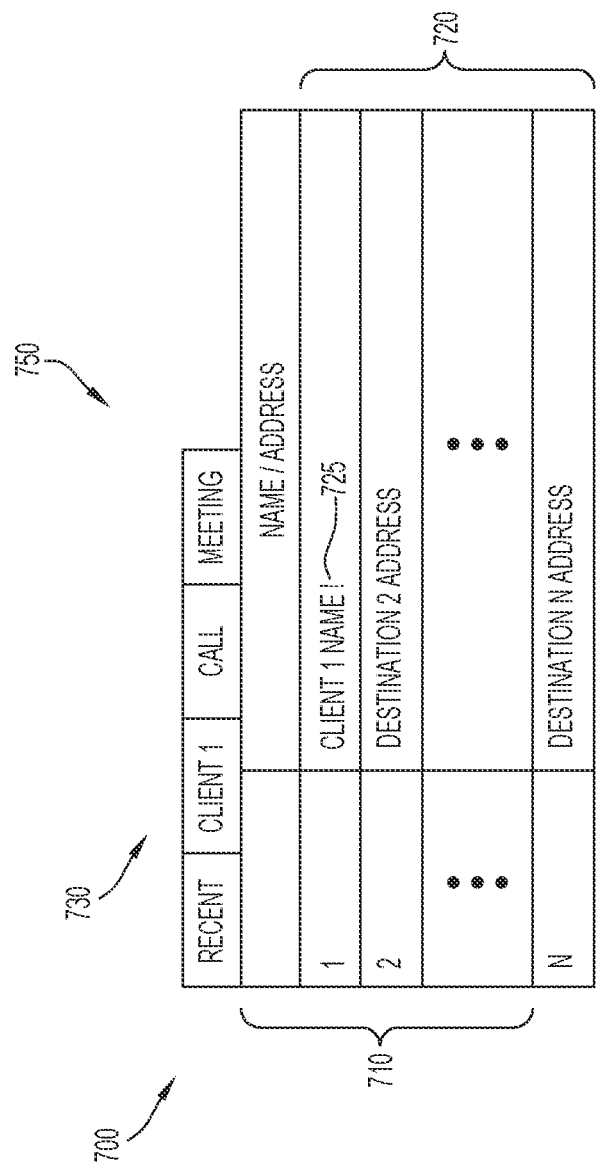
FIG. 7 illustrates an example user interface for managing and selecting destination locations for route generation, according to an example embodiment.

In an embodiment, user interface 700 includes a series of tabs 730 each including a set of geographic locations for a corresponding context (e.g., RECENT, CLIENT 1, CALL, MEETING as viewed in FIG. 7). Tabs 730 may be pre-configured or pre-determined, or may be created based on new contexts or tags determined from communication sessions (e.g., when a new context does not correspond to an existing tab, etc.). By way of example, the RECENT tab may indicate (or correspond to a context of) the most recent locations previously detected or selected. The CLIENT 1 tab may indicate (or correspond to a context of) locations corresponding to a client or customer (e.g., CLIENT 1). The CALL tab may indicate (or correspond to a context of) locations detected during a corresponding a call, while the MEETING tab may indicate (or correspond to a context of) locations detected during a corresponding meeting. The user may select a tab by manipulating an input mechanism (e.g., display buttons or actuators, mechanical actuators, etc.) of navigation system 160. The locations of the selected tab are displayed. Navigation module 165 may select an initial tab (e.g., a first tab, based on user preferences, a predetermined tab, etc.) which may be changed by the user.

User interface 700 may present geographic locations of a selected tab (e.g., RECENT tab as viewed in FIG. 7) in the form of a table 750 with an entry (or row) for each corresponding location. Each entry may include a row identifier or position field 710, and a location identification field 720. Row identifier field 710 includes a number or other indicator (e.g., 1, 2, . . . . N as viewed in FIG. 7) indicating a rank or position of a corresponding location in a list of entries in table 750. Location identification field 720 includes information (e.g., geographical or street address, name of an establishment or entity, name of a point of interest, etc.) identifying a corresponding location (e.g., CLIENT 1 NAME, DESTINATION 2 ADDRESS, . . . . DESTINATION N ADDRESS as viewed in FIG. 7). The locations of a selected tab may include locations selected by the user and/or locations detected during communication sessions, and may be sorted, ranked, or otherwise arranged based on relevance (e.g., detected user intents, recent mentions during an active communication session, etc.) where the most relevant locations are positioned higher in the list. Locations of a selected tab may be associated with an indication to identify locations detected during a communication session. For example, a location may be highlighted or otherwise visually modified (e.g., color change, bold, different font or size, underlined, etc.) and/or provided with an indicator (e.g., text, symbol, image, icon, etc.) to indicate a detected location. By way of example, location CLIENT 1 NAME may be associated with an indicator 725 (e.g., an exclamation point as viewed in FIG. 7) to indicate the location was detected during a communication session.

A route may be generated to a location in response to selection of the location, or in response to selection of the location and an indication from the user to generate the route by manipulating an input mechanism (e.g., display buttons or actuators, mechanical actuators, etc.) of navigation system 160.

Figure 8:
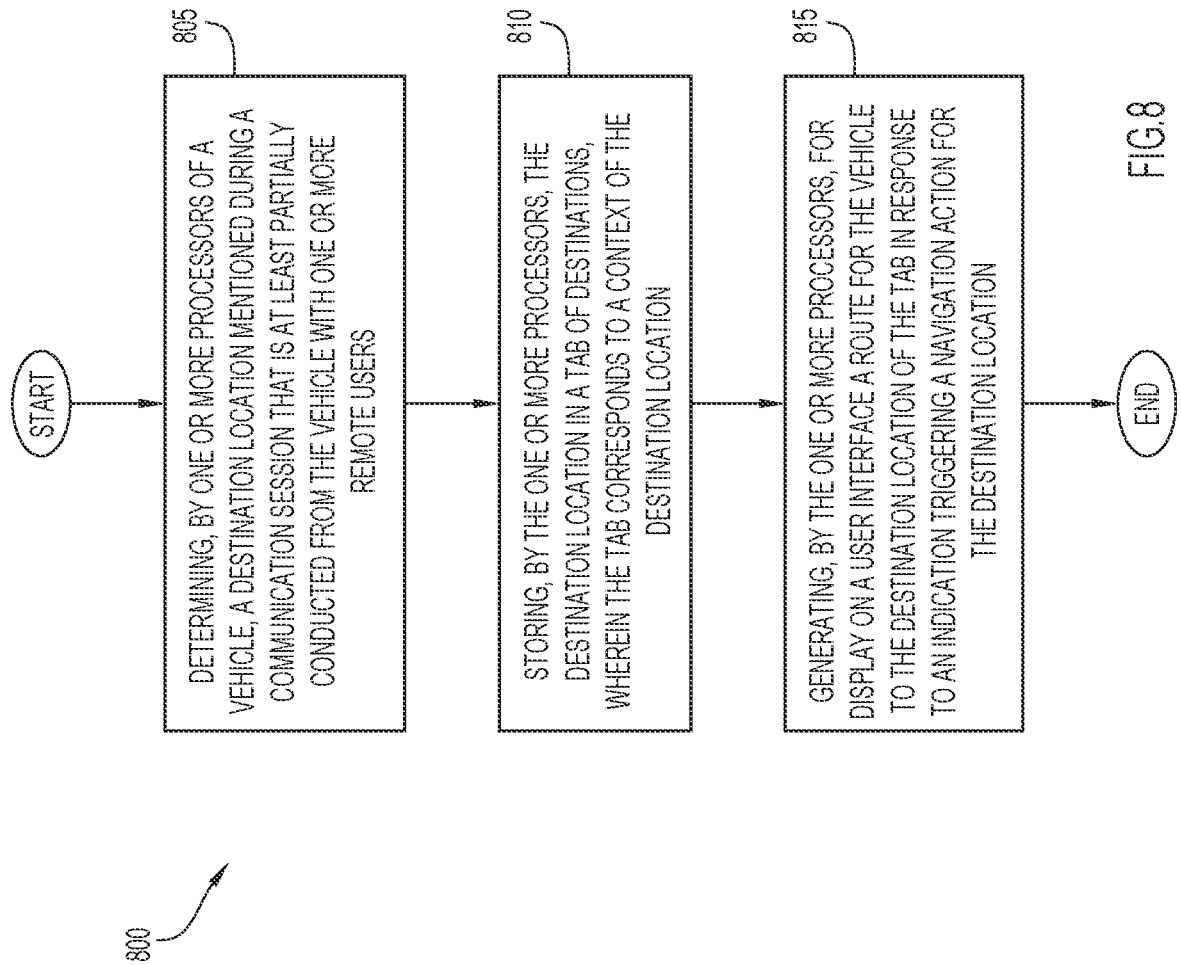
FIG. 8 illustrates a flowchart of a generalized method for detecting and managing destination locations mentioned during a communication session, according to an example embodiment.

FIG. 8 is a flowchart of an example method 800 for detecting and managing destination locations mentioned during a communication session according to an example embodiment. At operation 805, one or more processors of a vehicle determine a destination location mentioned during a communication session that is at least partially conducted from the vehicle with one or more remote users. At operation 810, the one or more processors store the destination location in a tab of destinations, wherein the tab corresponds to a context of the destination location. At operation 815, the one or more processors generate for display on a user interface a route for the vehicle to the destination location of the tab in response to an indication triggering a navigation action for the destination location.

Figure 9:
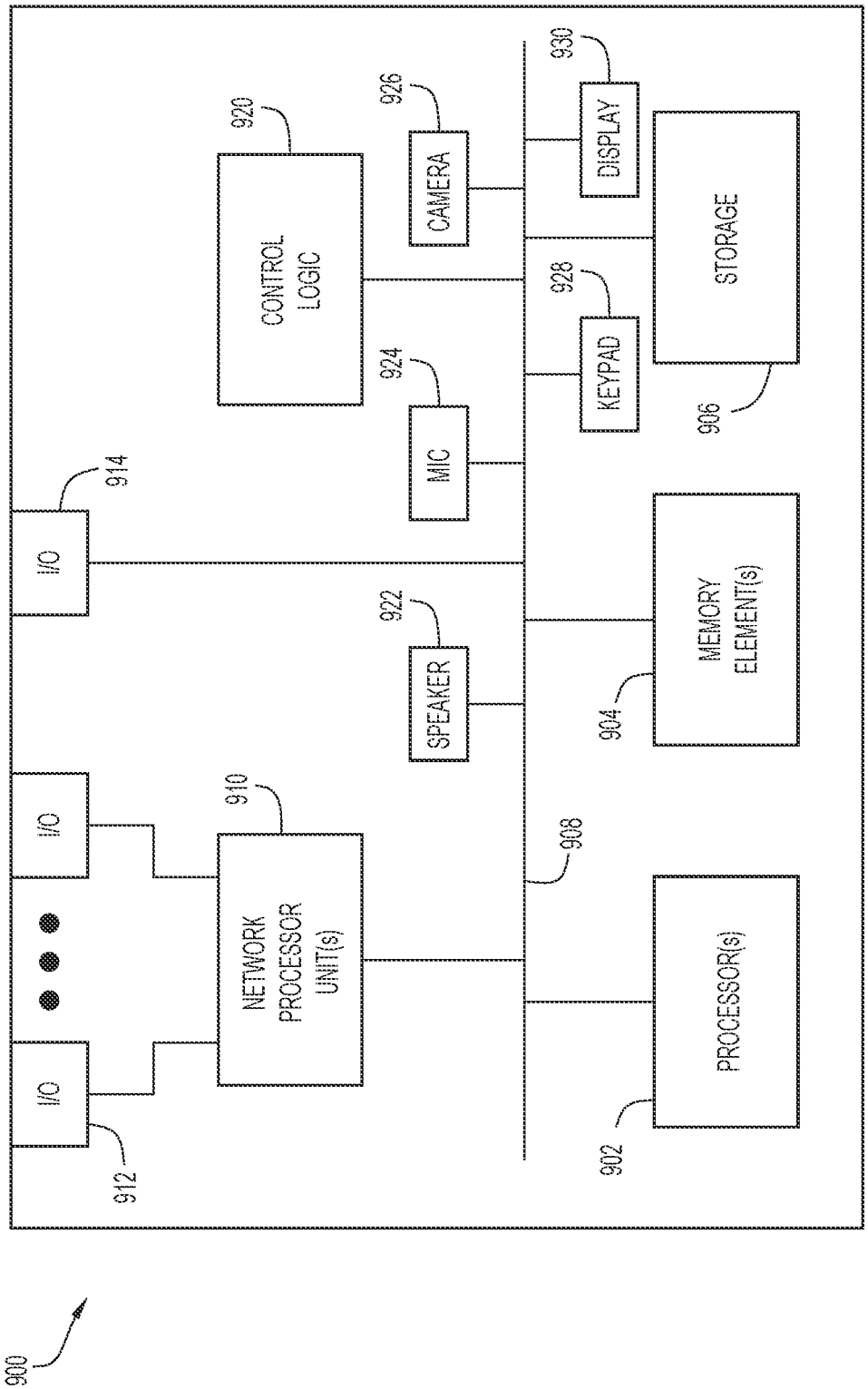
FIG. 9 illustrates a hardware block diagram of a computing device configured to perform functions associated with detecting and managing destination locations mentioned during a communication session as discussed herein, according to an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device or apparatus, such as computing device 900 or any combination of computing devices 900, may be configured as any device entity/entities (e.g., computer devices, meeting supervisor or other server systems, endpoint devices, user devices, etc.) as discussed for the techniques depicted in connection with FIGS. 1-8 in order to perform operations of the various techniques discussed herein.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, user device, etc.), computing device 900 may further include, or be coupled to, a speaker 922 to convey sound, microphone or other sound sensing device 924, camera or image capture device 926, a keypad or keyboard 928 to enter information (e.g., alphanumeric information, etc.), and/or a touch screen or other display 930. These items may be coupled to bus 908 or I/O interface(s) 914 to transfer data with other elements of computing device 900.

In various embodiments, control logic 920 can include instructions that, when executed, cause processor(s) 902 to perform operations, which can include, but not be limited to, providing overall control operations of computing device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, location module 150 (and/or services 195) monitors the communication session in real-time, thereby enabling detection of destination locations as they occur. In an embodiment, the machine learning models for detection of destination locations and intent may learn complex combinations of location and/or intent attributes (e.g., text, phrases, audio attributes, etc.), thereby increasing detection accuracy and reducing false positives. This reduces consumption of processing and memory/storage resources to improve computing performance. In an embodiment, location module 150 may reside on a vehicle to detect destination locations and intent during a communication session. This offloads processing from a meeting or server system, and enables the communication session (or other activity) and location, context, and intent detection and management to be performed (e.g., in parallel) without degrading performance of the communication session (or other activity).

In an embodiment, the machine learning models for detection of destination location and intent may be continuously updated (or trained) based on feedback related to detected locations and intent. For example, a destination location or intent may be detected within audio or textual information. Once feedback is provided with respect to the detection of a destination location or intent (e.g., user selection/non selection or deletion of a destination location, cancellation of a route due to an incorrect intent, etc.), the machine learning models may be updated (or trained) based on the feedback. By way of example, the information producing a verified destination location or intent may be used to update or train the machine learning models (e.g., update or train the machine learning models to increase the probability (or change a classification) of the scenario representing the verified destination location or intent, etc.). By way of further example, the information producing an incorrect destination location or intent may be used to update or train the machine learning models (e.g., update or train the machine learning models to decrease the probability (or change a classification) of the scenario representing the incorrect destination location or intent, etc.). Thus, the machine learning models may continuously evolve (or be trained) to learn further attributes with respect to destination locations and intent as the destination locations and intent are detected (or verified).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory elements 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly be connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: determining, by one or more processors of a vehicle, a destination location mentioned during a communication session that is at least partially conducted from the vehicle with one or more remote users; storing, by the one or more processors, the destination location in a tab of destinations, wherein the tab corresponds to a context of the destination location; and generating, by the one or more processors, for display on a user interface a route for the vehicle to the destination location of the tab in response to an indication triggering a navigation action for the destination location.

In one example, the communication session includes an online meeting and the destination location is determined based on one or more of audio, chat messages, and postings to a collaboration space associated with the online meeting.

In one example, the communication session includes a telephone call and the destination location is determined based on audio of the telephone call.

In one example, the method further comprises determining the context for the destination location based on communications from the communication session.

In one example, the method further comprises determining an intent of a user of the vehicle to travel to the destination location based on communications from the communication session, wherein the indication triggering the navigation action includes the intent of the user of the vehicle to travel to the destination location.

In one example, determining the destination location mentioned during the communication session includes receiving the destination location from services of a cloud environment that detect the destination location during the communication session.

In one example, determining the destination location mentioned during the communication session includes detecting the destination location mentioned during the communication session by the one or more processors of the vehicle.

In one example, the method further comprises presenting the tab on the user interface with the destination location visually modified.

In one example, the indication for triggering the navigation action includes user selection of the destination location from the tab presented on the user interface.

In another form, an apparatus is provided. The apparatus comprises: a system comprising one or more processors of a vehicle, wherein the one or more processors are configured to: determine a destination location mentioned during a communication session that is at least partially conducted from the vehicle with one or more remote users; store the destination location in a tab of destinations, wherein the tab corresponds to a context of the destination location; and generate for display on a user interface a route for the vehicle to the destination location of the tab in response to an indication triggering a navigation action for the destination location.

In another form, one or more non-transitory computer readable storage media are provided. The non-transitory computer readable storage media are encoded with processing instructions that, when executed by one or more processors of a vehicle, cause the one or more processors to: determine a destination location mentioned during a communication session that is at least partially conducted from the vehicle with one or more remote users; store the destination location in a tab of destinations, wherein the tab corresponds to a context of the destination location; and generate for display on a user interface a route for the vehicle to the destination location of the tab in response to an indication triggering a navigation action for the destination location.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
conducting over a network, by one or more processors of a vehicle, a communication session including a conversation between a user of the vehicle and one or more remote users;
monitoring the communication session in real-time and determining, by the one or more processors via natural language processing techniques, a destination location mentioned during the conversation of the communication session and a corresponding context of the destination location;
identifying, by the one or more processors, a tab maintained by a navigation system of the vehicle from among a plurality of tabs by comparing the corresponding context of the destination location to the plurality of tabs, wherein each tab stores at least one destination location;
storing, by the one or more processors, the destination location in the tab of the navigation system corresponding to the corresponding context of the destination location; and
generating and displaying on the navigation system, by the one or more processors, a route for the vehicle to the destination location of the tab in response to an indication triggering a navigation action for the destination location.

2. The method of claim 1, wherein the communication session includes an online meeting and the destination location is determined based on one or more of audio, chat messages, and postings to a collaboration space associated with the online meeting.

3. The method of claim 1, wherein the communication session includes a telephone call and the destination location is determined based on audio of the telephone call.

4. The method of claim 1, wherein the corresponding context of the destination location is determined based on communications from the communication session.

5. The method of claim 1, further comprising:
determining an intent of a user of the vehicle to travel to the destination location based on communications from the communication session, wherein the indication triggering the navigation action includes the intent of the user of the vehicle to travel to the destination location.

6. The method of claim 1, wherein storing the destination location includes:
storing the destination location in the tab of the navigation system via an application programming interface.

7. The method of claim 1, wherein determining the destination location mentioned during the conversation of the communication session includes:
detecting the destination location mentioned during the conversation of the communication session by one or more machine learning models.

8. The method of claim 1, further comprising:
presenting the tab on a user interface with the destination location visually modified.

9. The method of claim 8, wherein the indication for triggering the navigation action includes user selection of the destination location from the tab presented on the user interface.

10. An apparatus comprising:
a system comprising one or more processors of a vehicle, wherein the one or more processors are configured to:
conduct, over a network, a communication session including a conversation between a user of the vehicle and one or more remote users;
monitor the communication session in real-time and determine, via natural language processing techniques, a destination location mentioned during the conversation of the communication session and a corresponding context of the destination location;
identify a tab maintained by a navigation system of the vehicle from among a plurality of tabs by comparing the corresponding context of the destination location to the plurality of tabs, wherein each tab stores at least one destination location;
store the destination location in the tab of the navigation system corresponding to the corresponding context of the destination location; and
generate and display on the navigation system a route for the vehicle to the destination location of the tab in response to an indication triggering a navigation action for the destination location.

11. The apparatus of claim 10, wherein the communication session includes an online meeting and the destination location is determined based on one or more of audio, chat messages, and postings to a collaboration space associated with the online meeting.

12. The apparatus of claim 10, wherein the communication session includes a telephone call and the destination location is determined based on audio of the telephone call.

13. The apparatus of claim 10, wherein the one or more processors are further configured to:
determine an intent of a user of the vehicle to travel to the destination location based on communications from the communication session, wherein the indication triggering the navigation action includes the intent of the user of the vehicle to travel to the destination location.

14. The apparatus of claim 10, wherein storing the destination location includes:
storing the destination location in the tab of the navigation system via an application programming interface.

15. The apparatus of claim 10, wherein the one or more processors are further configured to:
present the tab on a user interface with the destination location visually modified.

16. One or more non-transitory computer readable storage media encoded with processing instructions that, when executed by one or more processors of a vehicle, cause the one or more processors to:
conduct, over a network, a communication session including a conversation between a user of the vehicle and one or more remote users;
monitor the communication session in real-time and determine, via natural language processing techniques, a destination location mentioned during the conversation of the communication session and a corresponding context of the destination location;

identify a tab maintained by a navigation system of the vehicle from among a plurality of tabs by comparing the corresponding context of the destination location to the plurality of tabs, wherein each tab stores at least one destination location;

store the destination location in the tab of the navigation system corresponding to the corresponding context of the destination location; and generate and display on the navigation system a route for the vehicle to the destination location of the tab in response to an indication triggering a navigation action for the destination location.

17. The one or more non-transitory computer readable storage media of claim 16, wherein the communication session includes an online meeting and the destination location is determined based on one or more of audio, chat messages, and postings to a collaboration space associated with the online meeting.

18. The one or more non-transitory computer readable storage media of claim 16, wherein the communication session includes a telephone call and the destination location is determined based on audio of the telephone call.

19. The one or more non-transitory computer readable storage media of claim 16, wherein the processing instructions further cause the one or more processors to:

determine an intent of a user of the vehicle to travel to the destination location based on communications from the communication session, wherein the indication triggering the navigation action includes the intent of the user of the vehicle to travel to the destination location.

20. The one or more non-transitory computer readable storage media of claim 16, wherein storing the destination location includes:

storing the destination location in the tab of the navigation system via an application programming interface.

\* \* \* \* \*